United States Patent [19]

Greenberg

[11] Patent Number: 5,188,703

[45] Date of Patent: Feb. 23, 1993

[54] METHOD AND APPARATUS FOR RECOVERING COPPER AND REGENERATING AMMONIACAL ETCHANT FROM SPENT AMMONIACAL ETCHANT

[75] Inventor: Bernard Greenberg, Brooklyn, N.Y.

[73] Assignee: Diversified Recycling Technology, Encino, Calif.

[21] Appl. No.: 826,132

[22] Filed: Jan. 27, 1992

[51] Int. Cl.[5] .......................... B44C 1/22; C23F 1/00
[52] U.S. Cl. .................................. 156/642; 156/666; 156/656; 156/345
[58] Field of Search .................... 156/642, 656, 659.1, 156/666, 345, 901, 902; 423/32; 134/10, 13, 109; 252/79.2, 79.4; 75/739, 740

[56] References Cited

U.S. PATENT DOCUMENTS

| | | | |
|---|---|---|---|
| 3,760,070 | 9/1973 | James et al. | 423/32 X |
| 4,058,431 | 11/1977 | Haas | 156/642 X |
| 4,252,621 | 2/1981 | Reinhardt et al. | 156/642 X |
| 4,576,677 | 3/1986 | Faul et al. | 156/642 |

FOREIGN PATENT DOCUMENTS

3115436 12/1982 Fed. Rep. of Germany ........ 423/32

*Primary Examiner*—William A. Powell
*Attorney, Agent, or Firm*—Thomas I. Rozsa

[57] ABSTRACT

The present invention is a method and apparatus for recovering copper (Cu) and regenerating ammoniacal etchant from spent ammoniacal etchant for the process of milling printed circuit boards. The basic steps of the present invention include (a) adding an adequate amount of hydrochloric acid (HCl) into a spent ammoniacal etchant containing copper ions ($Cu^{2+}$), ammonium ions ($NH_4^+$) and chloride ions ($Cl^-$) to produce an acidified spent ammoniacal etchant having a pH value in the range of between approximately 3 and approximately 6 and having increased concentrations of the ammonium ions ($NH_4^+$) and the chloride ions ($Cl^-$) substantially stoichiometrically equivalent to that of the copper ions ($Cu^{2+}$), so that all copper (Cu) contained in the acidified spent ammoniacal etchant is substantially precipitated as double salt copper ammonium chloride [$(NH_4)_2CuCl_{4(S)}$]; (b) separating the double salt copper ammonium chloride [$(NH_4)_2CuCl_{4(s)}$] from the acidified spent ammoniacal etchant; (c) recovering copper (Cu) from the separated double salt copper ammonium chloride [$(NH_4)_2CuCl_{4(s)}$]; and (d) regenerating ammoniacal etchant from the separated spent ammoniacal etchant.

27 Claims, 1 Drawing Sheet

METHOD AND APPARATUS FOR RECOVERING COPPER AND REGENERATING AMMONIACAL ETCHANT FROM SPENT AMMONIACAL ETCHANT

BACKGROUND OF THE INVENTION

1. Field of the Invention

The present invention relates generally to the field of treatment of spent etchant yielded from the manufacturing process of milling printed circuit boards. More particularly, the present invention relates to the field of recovery of copper and regeneration of ammoniacal etchant from spent ammoniacal etchant yielded from milling printed circuit boards in electronic and computer industries.

2. Description of the Prior Art

Printed circuit boards are widely used in many electronic and computer devices. A chemical milling process is commonly utilized in manufacturing printed circuit boards. In a typical chemical milling process, an etchant contained in an etchant solution etches the copper (Cu) plated or covered printed circuit board. One of the most commonly employed etchants in the electronic and computer industries is ammoniacal etchant which contains ammonia ($NH_3$) and ammonium chloride ($NH_4Cl$).

At the end of the milling process the etchant solution eventually becomes saturated with copper (Cu) and thus unusable. The unusable etchant solution yielded from the milling process is known in the industry as "spent etchant". If an ammoniacal etchant is used, it yields what is known in the industry as "spent ammoniacal etchant".

It has become a substantial environmental problem to dispose of spent etchant without any treatment after the milling process. The reason is that the spent etchant contains a significant amount of copper (Cu) and disposal of copper (Cu) is rigorously restricted under environmental laws and regulations.

In addition, disposing of spent etchant without any treatment results in great economic loss. In the case of disposal of spent ammoniacal etchant, not only significant amounts of copper (Cu), but also of ammonia ($NH_3$) and ammonium chloride ($NH_4Cl$) are lost.

There have been two basic approaches to recovering copper (Cu) from the spent etchant. One basic approach is to recover copper (Cu) through an electrolytic process. The other basic approach is to recover copper (Cu) through a chemical reaction process. The electrolytic process is generally not commercially available because it has not yet been proven practical.

U.S. Pat. No. 4,252,621 issued to Reinhardt et al. on Feb. 24, 1981 for "Process of Regenerating An Ammoniacal Etching Solution" (hereafter the "Reinhardt Patent") has disclosed a "LIX" system utilizing a chemical reaction process for the treatment of spent etchant and the recovery of copper (Cu) from the spent etchant. The "LIX" system disclosed in the Reinhardt Patent utilizes an organic agent to separate copper (Cu) from the spent etchant and then converts the separated copper (Cu) into copper sulfate ($CuSO_4$). The major disadvantage of the Reinhardt Patent is that both the capital and the operation costs of the LIX system are very high, which has substantially limited its commercial application.

There is therefore an urgent need for an effective and economic process of treating the spent etchant yielded from the milling of printed circuit boards in electronic and computer manufacturing industries. Particularly, it will be desirable to having a method and apparatus which is able to not only recover copper (Cu) contained in spent ammoniacal etchant but also regenerate the ammoniacal etchant from the spent ammoniacal etchant, where the regenerated ammoniacal etchant can be used again in the milling process.

SUMMARY OF THE INVENTION

The present invention is a method and apparatus for recovering copper (Cu) and regenerating ammoniacal etchant from spent ammoniacal etchant for the process of milling printed circuit boards.

It is known that spent ammoniacal etchant yielded from milling printed circuit boards contains free dissolute ammonia ($NH_3$), ammonium chloride ($NH_4Cl$) and copper (Cu), which is in the form of copper tetrammine complex ion $[Cu(NH_3)_4^{2+}]$. As the milling process continues, the ammoniacal etcant becomes saturated with copper (Cu). At this point in the milling process, the ammoniacal etchant becomes unusable as spent ammoniacal etchant. Disposal of the spent ammoniacal etchant becomes a major environmental problem because it contains a significant amount of copper (Cu). It also results in major economic loss.

The excessive amount of copper (Cu) contained in the spent ammoniacal etchant is a major disadvantage of the milling process, and it is the major obstacle that must be overcome for an effective treatment process.

It is a primary object of the present invention to provide a method and apparatus for recovering copper (Cu) and regenerating ammoniacal etchant from spent ammoniacal etchant yielded from the process of milling printed circuit boards in electronic and computer industries.

The fundamental novelty of the present invention is that it provides a method and apparatus for recovering copper (Cu) and regenerating ammoniacal etchant from spent ammoniacal etchant, which turns the negative effect and obstacle of having an excessive amount of copper (Cu) into a positive effect and advantage for the treatment process.

It has been discovered, according to the present invention, that if an adequate amount of hydrochloric acid (HCl) is added into spent ammoniacal etchant, then almost all of the ammonia in the spent ammoniacal etchant, both free and complexed, is converted into ammonium ions ($NH_4^+$) and the concentration of chloride ions ($Cl^-$) in the spent ammoniacal etchant is substantially increased.

It has also been discovered, according to the present invention, that if the concentrations of the chloride ions ($Cl^-$) and the ammonium ions ($NH_4^+$) in the spent ammoniacal etchant are increased by adding hydrochloric acid (HCl), it will lead to a substantial decrease in the concentration of copper ions ($Cu^{2+}$) in the spent ammoniacal etchant because of the formation of double salt copper ammonium chloride precipitation $[(NH_4)_2CuCl_{4(s)}]$ (hereafter the "double salt") from the spent ammoniacal etchant.

It has further been discovered, according to the present invention, that if the double salt $[(NH_4)_2CuCl_{4(s)}]$ precipitated from the spent ammoniacal etchant after the addition of hydrochloric acid (HCl) is separated from the remaining spent ammoniacal etchant by a filtering process, then the amount of copper (Cu) left in the filtrated spent ammoniacal etchant is substantially less than the amount of copper contained in the untreated spent ammoniacal etchant.

It has additionally been discovered, according to the present invention, that if the precipitated double salt $[(NH_4)_2CuCl_{4(s)}]$ is treated with sodium hydroxide (NaOH) by a boiling process, then the double salt $[(NH_4)_2CuCl_{4(s)}]$ can be converted into copper oxide (CuO), which copper oxide (CuO) in turn can be used by itself, or converted into commercial copper sulfate ($CuSO_4$) by treating the copper oxide (CuO) with sulfuric acid ($H_2SO_4$), or converted, by using appropriate acids, into other commercial copper salts such as copper acetate $[Cu(C_2H_3O_2)_2]$, copper carbonate ($CuCO_3$), copper chloride ($CuCl_2$), copper hydroxide $[Cu(OH)_2]$, copper nitrate $[Cu(NO_3)_2]$, copper oxychloride $[CuCl_2.3Cu(OOH)_2]$ and copper pyrophosphate ($Cu_2P_4O_7$).

It has again been discovered, according to the present invention, that if the filtrated spent ammoniacal etchant is further treated by passing through a tandem type ion-exchange system consisting of a typical acrylic acid cation-exchange resin followed by a chelating type cation-exchange resin to further remove copper, where the two resin type system is routinely employed because one resin can provide the holding capacity and the other resin can provide removal efficiency, and by adding ammonia ($NH_3$) to restore the concentration of ammonia ($NH_3$) to the level of the original ammoniacal etchant used in milling printed circuit boards, where the ammonia ($NH_3$) may come from different sources, then the spent ammoniacal etchant is completely regenerated as original ammoniacal etchant which can be used in further milling processes.

It is therefore an object of the present invention to provide a method and apparatus for recovering copper (Cu) and regenerating ammoniacal etchant from spent ammoniacal etchant, which utilizes a process of adding an adequate amount of hydrochloric acid (HCl) into the spent ammoniacal etchant substantially to convert almost all of the ammonia in the spent ammoniacal etchant, both free and complexed, into ammonium ions ($NH_4^+$) and to increase the concentration of chloride ions ($Cl^-$) in the spent ammoniacal etchant.

It is also an object of the present invention to provide a method and apparatus for recovering copper (Cu) and regenerating ammoniacal etchant from spent ammoniacal etchant, which utilizes a process of increasing the concentrations of the chloride ions ($Cl^-$) and the ammonium ions ($NH_4^+$) in the spent ammoniacal etchant substantially to decrease the concentration of copper ions ($Cu^+$) in the spent ammoniacal etchant through the formation of double salt $[(NH_4)_2CuCl_{4(s)}]$ from the spent ammoniacal etchant.

It is a further object of the present invention to provide a method and apparatus for recovering copper (Cu) and regenerating ammoniacal etchant from spent ammoniacal etchant, which utilizes a filtering process of separating the double salt $[(NH_4)_2CuCl_{4(s)}]$ precipitate from the remaining spent ammoniacal etchant substantially to decrease the amount of copper (Cu) left in the filtrated spent ammoniacal etchant.

It is an additional object of the present invention to provide a method and apparatus for recovering copper (Cu) and regenerating ammoniacal etchant from spent ammoniacal etchant, which utilizes a boiling process of treating the precipitated double salt $[(NH_4)_2CuCl_{4(s)}]$ with sodium hydroxide (NaOH) to convert the double salt $[(NH_4)_2CuCl_{4(s)}]$ into copper oxide (CuO) which may be used by itself as a commercial copper salt, and a process of treating the copper oxide (CuO) with sulfuric acid ($H_2SO_4$) to convert the copper oxide (CuO) into commercial copper sulfate ($CuSO_4$), or with other appropriate acids to convert the copper oxide (CuO) into other commercial copper salts, such as copper acetate $[Cu(C_2H_3O_2)_2]$, copper carbonate ($CuCO_3$), copper chloride ($CuCl_2$), copper hydroxide $[Cu(OH)_2]$, copper nitrate $[Cu(NO_3)_2]$, copper oxychloride $[CuCl_2.3Cu(OOH)_2]$ and copper pyrophosphate ($Cu_2P_4O_7$).

It is again an object of the present invention to provide a method and apparatus for recovering copper (Cu) and regenerating ammoniacal etchant from spent ammoniacal etchant, which utilizes a process of passing the filtrated spent ammoniacal etchant through a tandem type ion-exchange system consisting of a typical acrylic acid cation-exchange resin followed by a chelating type cation-exchange resin to further remove copper, where the two resin type system is routinely employed because one resin can provide the holding capacity and the other resin can provide removal efficiency, and a process of adding ammonia ($NH_3$) to restore the concentration of ammonia ($NH_3$) to the level of the original ammoniacal etchant used in milling printed circuit boards, where the ammonia ($NH_3$) may come from different sources, so that the spent ammoniacal etchant is completely regenerated as original ammoniacal etchant which can be used in future milling processes.

The basic steps of the present invention method include (a) adding an adequate amount of hydrochloric acid (HCl) into a spent ammoniacal etchant containing copper ions ($Cu^{2+}$), ammonium ions ($NH_4^+$) and chloride ions ($Cl^-$) to produce an acidified spent ammoniacal etchant having a pH value in the range of between approximately 3 and approximately 6 and having increased concentrations of the ammonium ions ($NH_4^+$) and the chloride ions ($Cl^-$) substantially stoichiometrically equivalent to that of the copper ions ($Cu^{2+}$), so that all copper (Cu) contained in the acidified spent ammoniacal etchant is substantially precipitated as double salt copper ammonium chloride $[(NH_4)_2CuCl_{4(s)}]$; (b) separating the double salt copper ammonium chloride $[(NH_4)_2CuCl_{4(s)}]$ from the acidified spent ammoniacal etchant; (c) recovering copper (Cu) from the separated double salt copper ammonium chloride $[(NH_4)_2CuCl_{4(s)}]$; and (d) regenerating ammoniacal etchant from the separated spent ammoniacal etchant.

The basic parts of the present invention apparatus include (a) means of adding an adequate amount of hydrochloric acid (HCl) into a spent ammoniacal etchant containing copper ions ($Cu^{2+}$), ammonium ions ($NH_4^+$) and chloride ions ($Cl^-$) to produce an acidified spent ammoniacal etchant having a pH value in the range of between approximately 3 and approximately 6 and having increased concentrations of the ammonium ions ($NH_4^+$) and the chloride ions ($Cl^-$) substantially stoichiometrically equivalent to that of the copper ions ($Cu^{2+}$), so that all copper (Cu) contained in the acidified spent ammoniacal etchant is substantially precipitated as double salt copper ammonium chloride $[(NH_4)_2CuCl_{4(s)}]$; (b) means for separating the double salt copper ammonium chloride $[(NH_4)_2CuCl_{4(s)}]$ from the acidified spent ammoniacal etchant; (c) means for recovering copper (Cu) from the separated double salt copper ammonium chloride $[(NH_4)_2CuCl_{4(s)}]$; and (d)

means for regenerating ammoniacal etchant from the separated spent ammoniacal etchant.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DESCRIPTION OF THE PREFERRED EMBODIMENT

Figure 1:
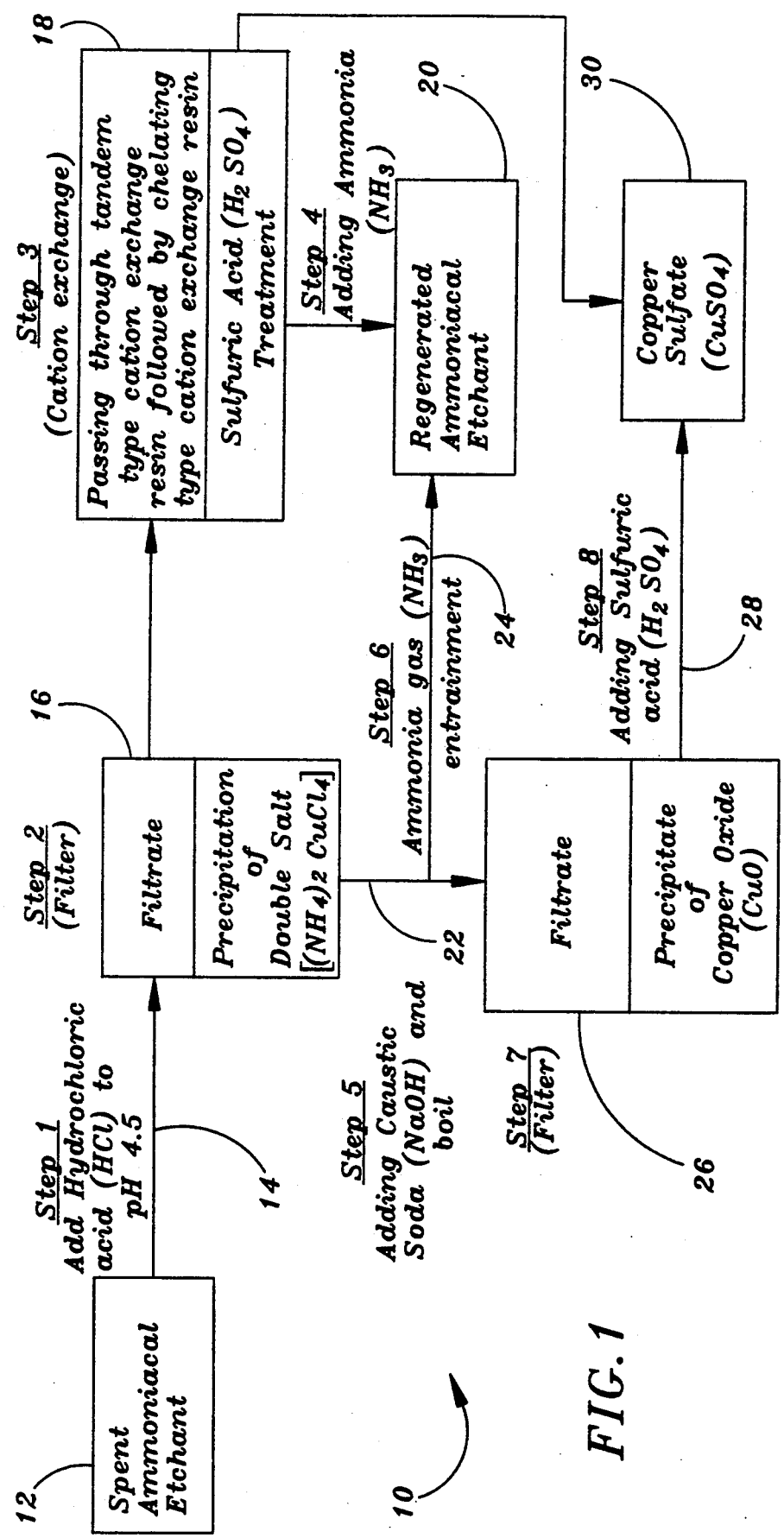
FIG. 1 is a flow chart block diagram illustrating the basic steps of the present invention method and apparatus for recovering copper (Cu) and regenerating ammoniacal etchant from spent ammoniacal etchant for the process of milling printed circuit boards.

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

The present invention is a method and apparatus for recovering copper (Cu) and regenerating ammoniacal etchant from a spent ammoniacal etchant containing copper (Cu) and ammonia ($NH_3$) yielded from the process of milling printed circuit boards in the electronic and computer industries.

Referring to FIG. 1, there is shown at 10 the basic steps of the present invention method and apparatus. Spent ammoniacal etchant 12 is yielded from the process of milling printed circuit boards. The spent ammoniacal etchant 12 contains copper ions ($Cu^{2+}$), ammonium ions ($NH_4^+$) and chloride ions ($Cl^-$). It also contains free ammonia ($NH_3$), ammonium chloride ($NH_4Cl$) and copper tetrammine complex ion [$Cu(NH_3)_4^{2+}$]. As the milling process continues, the concentration of copper (Cu) in the ammoniacal etchant used in the milling process reaches an excessive level, such that the ammoniacal etchant is no longer usable and becomes spent ammoniacal etchant 12. The spent ammoniacal etchant 12 is saturated by copper (Cu), which is a major negative effect and obstacle of further disposal or treatment of the spent ammoniacal etchant 12 in the electronic and computer industries.

One of the novel features of the present invention method and apparatus is that it makes use of the fact that the spent ammoniacal etchant 12 is saturated by copper (Cu). In fact, the present invention treatment process takes advantage of the fact that the concentration of copper ions ($Cu^{2+}$) in the spent ammoniacal etchant 12 is substantially stoichiometrically equivalent to the concentration of the ammonium ions ($NH_4^+$) in the spent ammoniacal etchant 12, and turns it into an ideal starting point of the treatment process. Therefore, what was very undesirable for prior or other treatment processes is totally appropriate for the present invention treatment process.

The basic steps 10 will be described in detail below. It is appreciated that after Step 2, Steps 3 and 4 may be proceeded to independently without the performance of Steps 5 through 8, or vice versa, i.e., Steps 5 through 8 may be proceeded to independently without the performance of Steps 3 and 4. In addition, unless otherwise specified, all the processes occur under ambient pressure and at ambient temperature.

STEP 1

Addition of Hydrochloric acid

The critical steps of the present invention treatment process 10 is the first and second steps (Steps 1 and 2). The purpose of Steps 1 and 2 is to separate copper (Cu) from the spent ammoniacal etchant. First, the spent ammoniacal etchant 12 is acidified with hydrochloric acid (HCl) 14. An adequate amount of hydrochloric acid (HCl) 14 is added to the spent ammoniacal etchant 12 to substantially convert almost all of the ammonia in the spent ammoniacal etchant 12, both in the free form as ammonia ($NH_3$) and in the complexed form as ammonium chloride ($NH_4Cl$), into ammonium ions ($NH_4^+$), and to increase the concentration of chloride ions ($Cl^-$) in the spent ammoniacal etchant 12. The following chemical reaction may take place:

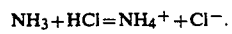

$$NH_3 + HCl = NH_4^+ + Cl^-.$$

After adding hydrochloric acid (HCl) 14, the pH of the spent ammoniacal etchant should be decreased into the range of between approximately 3 and approximately 6. It is preferable to decrease the pH value of the spent ammoniacal etchant into the range of between approximately 4 and 5. The most preferable pH value of the spent ammoniacal etchant, after the addition of hydrochloric acid (HCl) 14, is approximately 4.5. For example only, the hydrochloric acid (HCl) used in this step may be of approximately 20% of 12 molar (22° Baumé) hydrochloric acid (HCl).

STEP 2

Separation of Double Salt from Spent Ammoniacal Etchant

When an adequate amount of hydrochloric acid (HCl) is added to the spent ammoniacal etchant, almost all of the ammonia in the spent ammoniacal etchant, both in the free form as ammonia ($NH_3$) and in the complexed form, are substantially converted into ammonium ions ($NH_4^+$). In addition, the concentration of chloride ions ($Cl^-$) in the spent ammoniacal etchant is substantially increased. This serves to depress the concentration of the copper ions ($Cu^+$) because of the precipitation of the double salt [$(NH_4)_2CuCl_{4(s)}$] in the separation process 16. The chemical reaction of that process can be expressed by the following equation:

$$Cu^{2+} + 2NH_4^+ + 4Cl^- = (NH_4)_2CuCl_{4(s)}.$$

The equilibrium expression for this process may be written as:

$$K_{eq} = \frac{[(NH_4)_2CuCl_{4(s)}]}{[Cu^{2+}][NH_4^+]^2[Cl^-]^4}$$

Through this precipitation process 16, the copper (Cu) concentration in the spent ammoniacal etchant will typically drop to under approximately one thousand parts per million (1,000 ppm). The double salt [$(NH_4)_2CuCl_{4(s)}$] can be filtered off in the separation process 16 from the spent ammoniacal etchant. Therefore, at the end of the separation filtration process, there are two products: double salt [$(NH_4)_2CuCl_{4(s)}$] and separated spent ammoniacal etchant.

STEP 3

Treatment of Separated Spent Ammoniacal Etchant

The separated spent ammoniacal etchant contains a substantially small concentration of copper (Cu) of below approximately one thousand parts per million (1,000 ppm). In Step 3 shown at 18, the separated spent ammoniacal etchant is treated by passing it through a tandem type ion-exchange system consisting of a typical acrylic acid cation-exchange resin followed by a chelating type cation-exchange resin to further remove copper, where the two resin type system is routinely employed because one resin can provide the holding capacity and the other resin can provide removal efficiency, to further remove copper (Cu) and other metal impurities, such as lead (Pb) or zinc (Zn), from the separated spent ammoniacal etchant.

The exchange process 18 produces a substantially copper-free ammoniacal etchant, wherein the copper (Cu) concentration may be less than ten parts per million (10 ppm). If the cation-exchange resin bed at 18 is further treated with sulfuric acid ($H_2SO_4$), then the copper (Cu) retained by the resin bed may be recovered as copper sulfate ($CuSO_4$):

$$Cu^{2+} + H_2SO_4 = CuSO_4 + 2H^+.$$

Alternatively, other appropriate acids may be employed to recover copper (cu) in the form of other commercial such acetate 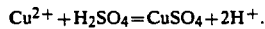 $H_3O_2)_2$], copper carbonate ($CuCO_3$), copper chloride ($CuCl_2$), copper hydroxide [$Cu(OH)_2$], copper nitrate [$Cu(NO_3)_2$], copper oxychloride [$CuCl_2.3Cu(OOH)_2$] and copper pyrophosphate ($Cu_2P_4O_7$).

STEP 4

Regeneration of the Ammoniacal Etchant

The concentration of ammonia ($NH_3$) in the substantially copper-free ammoniacal etchant resulted from Step 3 is less than that of the original ammoniacal etchant used for the milling process. Therefore, it is necessary to restore the concentration of the ammonia ($NH_3$) in the resultant substantially copper-free ammoniacal etchant to a level substantially equivalent to that of the original ammoniacal etchant.

The restoring of the concentration of ammonia ($NH_3$) can be done by adding an adequate amount of ammonia ($NH_3$) into the resultant substantially copper-free ammoniacal etchant as shown at 20. The ammonia ($NH_3$) may be stock ammonia ($NH_3$), or, as will be described later, the ammonia ($NH_3$) from the copper recovery process of the present invention.

Once the concentration of ammonia ($NH_3$) in the substantially copper-free ammoniacal etchant is restored to the level substantially equivalent to that of the original ammoniacal etchant, the regeneration process of the spent ammoniacal etchant is completed and the resultant regenerated ammoniacal etchant may be used in future processes of milling printed circuit boards in the electronic and computer industries.

STEP 5

Conversion of Double Salt into Copper Oxide

The double salt [$(NH_4)_2CuCl_{4(s)}$] separated from Step 2 may be further treated to recover copper (Cu). In Step 5 shown at 22, the double salt [$(NH_4)_2CuCl_{4(s)}$] is boiled with the addition of sodium hydroxide (caustic soda) (NaOH) to convert the double salt [$(NH_4)_2CuCl_{4(s)}$] into copper oxide (CuO):

$$(NH_4)_2CuCl_{4(s)} + 4NaOH = CuO + 2NH_3 + 4NaCl + 3H_2O.$$

The products of this reaction is copper oxide (CuO), salt (NaCl) and gaseous ammonia ($NH_3$).

STEP 6

Re-using Ammonia In Regenerating Ammoniacal Etchant

The gaseous entrainment of ammonia ($NH_3$) produced from the above reaction may be transferred in Step 6 shown at 24 to be used in the process of restoring the concentration of ammonia ($NH_3$) in the regenerated ammoniacal etchant shown at 20, as mentioned earlier.

STEP 7

Separation of Copper Oxide from Salt

Step 7 shown at 26 is a filtering process, wherein the salt (NaCl) produced from the above boiling process can be filtrated and discarded, thereby allowing the precipitate of copper oxide (CuO) to be separated. A standard plate and frame filter press can be used with commercially available filter cloth. This process is a standard filtration process. The copper oxide (CuO) produced in this step may be used by itself as a commercial copper salt, or converted into other commercial copper salts by proper treatment with appropriate acids.

STEP 8

Conversion of Copper Oxide into Copper Sulfate

The precipitate of copper oxide (CuO) can be treated with sulfuric acid ($H_2SO_4$) to produce copper sulfate ($CuSO_4$), in Step 8 shown at 28:

$$CuO + H_2SO_4 = CuSO_4 + H_2O$$

where the copper sulfate ($CuSO_4$) may be further crystallized as pentahydrate. The copper sulfate ($CuSO_4$) shown at 30, which is recovered from both Step 3 shown at 18 and Step 8 shown at 28, has a variety of commercial applications.

If treated with other appropriate acids, then other commercial copper salts may be obtained, such as copper acetate [$Cu(C_2H_3O_2)_2$], copper carbonate ($CuCO_3$), copper chloride ($CuCl_2$), copper hydroxide [$Cu(OH)_2$], copper oxychloride [$CuCl_2.3Cu(OOH)_2$] and copper pyrophosphate ($Cu_2P_4O_7$).

The present invention has many advantages features, including: (a) it turns the disadvantage of having saturated copper in the spent ammoniacal etchant into an advantageous starting point of the treatment process; (b) the precipitation of the double salt [$(NH_4)_2CuCl_{4(s)}$] is very rapid, thereby significantly shortening the time required for the treatment process; and (c) it is a very simple process which does not require complicated equipment or expensive materials. In addition, the present invention process does not yield any environmentally hazardous materials.

Defined in detail, the present invention is a method for recovering copper (Cu) and regenerating ammoniacal etchant from a spent ammoniacal etchant containing copper (Cu) and ammonia ($NH_3$), comprising: (a) adding an adequate amount of hydrochloric acid (HCl) into a spent ammoniacal etchant containing copper ions ($Cu^{2+}$), ammonium ions ($NH_4^+$) and chloride ions ($Cl^-$) to produce an acidified spent ammoniacal etchant having a pH value of approximately 4.5 and having increased concentrations of the ammonium ions ($NH_4^+$) and the chloride ions ($Cl^-$) substantially stoichiometrically equivalent to that of the copper ions ($Cu^{2+}$), so that all copper (Cu) contained in the acidified spent ammoniacal etchant is substantially precipitated as double salt copper ammonium chloride [$(NH_4)_2CuCl_{4(s)}$]; (b) separating the double salt copper ammonium chloride [$(NH_4)_2CuCl_{4(s)}$] from the acidified spent ammoniacal etchant by filtration, so that the separated spent ammoniacal etchant contains less than one thousand parts per million (1,000 ppm) of copper (Cu); (c) converting the separated double salt copper ammonium chloride [$(NH_4)_2CuCl_{4(s)}$] into copper oxide (CuO) by using sodium hydroxide (NaOH), which also produces ammonia ($NH_3$) and sodium chloride (NaCl); (d) separating the copper oxide (CuO) from the ammonia ($NH_3$) and the sodium chloride (NaCl); (e) converting the copper oxide (CuO) into copper sulfate ($CuSO_4$) by using sulfuric acid ($H_2SO_4$) to thereby recover copper (Cu); (f) removing the substantially small amount of copper (Cu) from the separated spent ammoniacal etchant by passing the separated spent ammoniacal etchant through a tandem type cation-exchange resin to produce a substantially copper-free ammoniacal etchant having less than ten parts per million (10 ppm) of copper (Cu); and (g) restoring the concentration of the ammonia ($NH_3$) substantially equivalent to that of an original ammoniacal etchant by adding an adequate amount of ammonia ($NH_3$) into the substantially copper-free ammoniacal etchant, to thereby produce a regenerated ammoniacal etchant.

Defined also in detail, the present invention is a method for recovering copper (Cu) from a spent ammoniacal etchant containing copper (Cu) and ammonia ($NH_3$), comprising: (a) adding an adequate amount of hydrochloric acid (HCl) into a spent ammoniacal etchant containing copper ions ($Cu^{2+}$), ammonium ions ($NH_4^+$) and chloride ions ($Cl^-$) to produce an acidified spent ammoniacal etchant having a pH value of approximately 4.5 and having increased concentrations of the ammonium ions ($NH_4^+$) and the chloride ions ($Cl^-$) substantially stoichiometrically equivalent to that of the copper ions ($Cu^{2+}$), so that all copper (Cu) contained in the acidified spent ammoniacal etchant is substantially precipitated as double salt copper ammonium chloride [$(NH_4)_2CuCl_{4(s)}$]; (b) separating the double salt copper ammonium chloride [$(NH_4)_2CuCl_{4(s)}$] from the acidified spent ammoniacal etchant by filtration; (c) converting the separated double salt copper ammonium chloride [$(NH_4)_2CuCl_{4(s)}$] into copper oxide (CuO) by using sodium hydroxide (NaOH), which also produces ammonia ($NH_3$) and sodium chloride (NaCl); (d) separating the copper oxide (CuO) from the ammonia ($NH_3$) and the sodium chloride (NaCl); and (e) converting the copper oxide (CuO) into copper sulfate ($CuSO_4$) by using sulfuric acid ($H_2SO_4$) to thereby recover copper (Cu).

Defined again in detail, the present invention is a method for regenerating ammoniacal etchant from a spent ammoniacal etchant containing copper (Cu), ammonia ($NH_3$) and ammonium chloride ($NH_4Cl$), comprising: (a) adding an adequate amount of hydrochloric acid (HCl) into a spent ammoniacal etchant containing copper ions ($Cu^{2+}$), ammonium ions ($NH_4^+$) and chloride ions ($Cl^-$) to produce an acidified spent ammoniacal etchant having a pH value of approximately 4.5 and having increased concentrations of the ammonium ions ($NH_4^+$) and the chloride ions ($Cl^-$) substantially stoichiometrically equivalent to that of the copper ions ($Cu^{2+}$), so that all copper (Cu) contained in the acidified spent ammoniacal etchant is substantially precipitated as double salt copper ammonium chloride [$(NH_4)_2CuCl_{4(s)}$]; (b) separating the double salt copper ammonium chloride [$(NH_4)_2CuCl_{4(s)}$] from the acidified spent ammoniacal etchant by filtration, so that the separated spent ammoniacal etchant contains less than one thousand parts per million (1,000 ppm) of copper (Cu); (c) removing the substantially small amount of copper (Cu) from the separated spent ammoniacal etchant by passing the separated spent ammoniacal etchant through a tandem type cation-exchange resin to produce a substantially copper-free ammoniacal etchant having less than ten parts per million (10 ppm) of copper (Cu); and (d) restoring the concentration of the ammonia ($NH_3$) substantially equivalent to that of an original ammoniacal etchant by adding an adequate amount of ammonia ($NH_3$) into the substantially copper-free ammoniacal etchant, to thereby produce a regenerated ammoniacal etchant.

Defined alternatively in detail, the present invention is an apparatus for recovering copper (Cu) and regenerating ammoniacal etchant from a spent ammoniacal etchant containing copper (Cu), ammonia ($NH_3$) and ammonium chloride ($NH_4Cl$), comprising: (a) means for adding an adequate amount of hydrochloric acid (HCl) into a spent ammoniacal etchant containing copper ions ($Cu^{2+}$), ammonium ions ($NH_4^+$) and chloride ions ($Cl^-$) to produce an acidified spent ammoniacal etchant having a pH value of approximately 4.5 and having increased concentrations of the ammonium ions ($NH_4^+$) and the chloride ions ($Cl^-$) substantially stoichiometrically equivalent to that of the copper ions ($Cu^{2+}$), so that all copper (Cu) contained in the acidified spent ammoniacal etchant is substantially precipitated as double salt copper ammonium chloride [$(NH_4)_2CuCl_{4(s)}$]; (b) means for separating the double salt copper ammonium chloride [$(NH_4)_2CuCl_{4(s)}$] from the acidified spent ammoniacal etchant by filtration, so that the separated spent ammoniacal etchant contains less than one thousand parts per million (1,000 ppm) of copper (Cu); (c) means for converting the separated double salt copper ammonium chloride [$(NH_4)_2CuCl_{4(s)}$] into copper oxide (CuO) by using sodium hydroxide (NaOH), which also produces ammonia ($NH_3$) and sodium chloride (NaCl); (d) means for separating the copper oxide (CuO) from the ammonia ($NH_3$) and the sodium chloride (NaCl); (e) means for converting the copper oxide (CuO) into copper sulfate ($CuSO_4$) by using sulfuric acid ($H_2SO_4$) to thereby recover copper (Cu); (f) means for removing the substantially small amount of copper (Cu) from the separated spent ammoniacal etchant by passing the separated spent ammoniacal etchant through a tandem type cation-exchange resin to produce a substantially copper-free ammoniacal etchant having less than ten parts per million (10 ppm) of copper (Cu); and (g) means for restoring the concentration of the ammonia ($NH_3$) substantially equivalent to that of an original ammoniacal etchant by adding an adequate amount of ammonia ($NH_3$) into the substantially copper-free ammoniacal etchant, to thereby produce a regenerated ammoniacal etchant.

Defined broadly, the present invention is a method for recovering copper (Cu) and regenerating ammoniacal etchant from a spent ammoniacal etchant containing copper (Cu) and ammonia ($NH_3$), comprising: (a) adding an adequate amount of hydrochloric acid (HCl) into a spent ammoniacal etchant containing copper ions ($Cu^{2+}$), ammonium ions ($NH_4^+$) and chloride ions ($Cl^-$) to produce an acidified spent ammoniacal etchant having a pH value in the range of between approximately 4 and approximately 5 and having increased concentrations of the ammonium ions ($NH_4^+$) and the chloride ions ($Cl^-$) substantially stoichiometrically equivalent to that of the copper ions ($Cu^{2+}$), so that all copper (Cu) contained in the acidified spent ammoniacal etchant is substantially precipitated as double salt copper ammonium chloride [$(NH_4)_2CuCl_{4(s)}$]; (b) separating the double salt copper ammonium chloride [$(NH_4)_2CuCl_{4(s)}$]; from the acidified spent ammoniacal etchant, so that the separated spent ammoniacal etchant contains only a substantially small amount of copper (Cu); (c) converting the separated double salt copper ammonium chloride [$(NH_4)_2CuCl_{4(s)}$] into copper oxide (CuO); (d) converting the copper oxide (CuO) into copper sulfate ($CuSO_4$) to thereby recover copper (Cu); (e) removing the substantially small amount of copper (Cu) from the separated spent ammoniacal etchant to produce a substantially copper-free ammoniacal etchant; and (f) restoring the concentration of the ammonia ($NH_3$) substantially equivalent to that of an original ammoniacal etchant to thereby produce a regenerated ammoniacal etchant.

Defined also broadly, the present invention is a method for recovering copper (Cu) from a spent ammoniacal etchant containing copper (Cu), comprising: (a) adding an adequate amount of hydrochloric acid (HCl) into a spent ammoniacal etchant containing copper ions ($Cu^{2+}$), ammonium ions ($NH_4^+$) and chloride ions ($Cl^-$) to produce an acidified spent ammoniacal etchant having a pH value in the range of between approximately 4 and approximately 5 and having increased concentrations of the ammonium ions ($NH_4^+$) and the chloride ions ($Cl^-$) substantially stoichiometrically equivalent to that of the copper ions ($Cu^{2+}$), so that all copper (Cu) contained in the acidified spent ammoniacal etchant is substantially precipitated as double salt copper ammonium chloride [$(NH_4)_2CuCl_{4(s)}$]; (b) separating the double salt copper ammonium chloride [$(NH_4)_2CuCl_{4(s)}$] from the acidified spent ammoniacal etchant; (c) converting the separated double salt copper ammonium chloride [$(NH_4)_2CuCl_{4(s)}$] into copper oxide (CuO); and (d) converting the copper oxide (CuO) into copper sulfate ($CuSO_4$) to thereby recover copper (Cu).

Defined again broadly, the present invention is a method for regenerating ammoniacal etchant from a spent ammoniacal etchant containing copper (Cu) and ammonia ($NH_3$), comprising: (a) adding an adequate amount of hydrochloric acid (HCl) into a spent ammoniacal etchant containing copper ions ($Cu^{2+}$), ammonium ions ($NH_4^+$) and chloride ions ($Cl^-$) to produce an acidified spent ammoniacal etchant having a pH value in the range of between approximately 4 and approximately 5 and having increased concentrations of the ammonium ions ($NH_4^+$) and the chloride ions ($Cl^-$) substantially stoichiometrically equivalent to that of the copper ions ($Cu^{2+}$), so that all copper (Cu) contained in the acidified spent ammoniacal etchant is substantially precipitated as double salt copper ammonium chloride [$(NH_4)_2CuCl_{4(s)}$]; (b) separating the double salt copper ammonium chloride [$(NH_4)_2CuCl_{4(s)}$] from the acidified spent ammoniacal etchant, so that the separated spent ammoniacal etchant contains only a substantially small amount of copper (Cu); (c) removing the substantially small amount of copper (Cu) from the separated spent ammoniacal etchant to produce a substantially copper-free ammoniacal etchant; and (d) restoring the concentration of the ammonia ($NH_3$) substantially equivalent to that of an original ammoniacal etchant to thereby produce a regenerated ammoniacal etchant.

Alternatively defined broadly, the present invention is an apparatus for recovering copper (Cu) and regenerating ammoniacal etchant from a spent ammoniacal etchant containing copper (Cu) and ammonia ($NH_3$), comprising: (a) means for adding an adequate amount of hydrochloric acid (HCl) into a spent ammoniacal etchant containing copper ions ($Cu^{2+}$), ammonium ions ($NH_4^+$) and chloride ions ($Cl^-$) to produce an acidified spent ammoniacal etchant having a pH value in the range of between approximately 4 and 5 and having increased concentrations of the ammonium ions ($NH_4^+$) and the chloride ions ($Cl^-$) substantially stoichiometrically equivalent to that of the copper ions ($Cu^{2+}$), so that all copper (Cu) contained in the acidified spent ammoniacal etchant is substantially precipitated as double salt copper ammonium chloride [$(NH_4)_2CuCl_{4(s)}$]; (b) means for separating the double salt copper ammonium chloride [$(NH_4)_2CuCl_{4(s)}$] from the acidified spent ammoniacal etchant, so that the separated spent ammoniacal etchant contains only a substantially small amount of copper (Cu); (c) means for converting the separated double salt copper ammonium chloride [$(NH_4)_2CuCl_{4(s)}$] into copper oxide (CuO); (d) means for converting the copper oxide (CuO) into copper sulfate ($CuSO_4$) to thereby recover copper (Cu); (e) means for removing the substantially small amount of copper (Cu) from the separated spent ammoniacal etchant to produce a substantially copper-free ammoniacal etchant; and (f) means for restoring the concentration of the ammonia ($NH_3$) substantially equivalent to that of an original ammoniacal etchant to thereby produce a regenerated ammoniacal etchant.

Defined more broadly, the present invention is a method for recovering copper (Cu) and regenerating ammoniacal etchant from a spent ammoniacal etchant containing copper (Cu), comprising: (a) adding an adequate amount of hydrochloric acid (HCl) into a spent ammoniacal etchant containing copper ions ($Cu^{2+}$), ammonium ions ($NH_4^+$) and chloride ions ($Cl^-$) to produce an acidified spent ammoniacal etchant having a pH value in the range of between approximately 3 and approximately 6 and having increased concentrations of the ammonium ions ($NH_4^+$) and the chloride ions ($Cl^-$) substantially stoichiometrically equivalent to that of the copper ions ($Cu^{2+}$), so that all copper (Cu) contained in the acidified spent ammoniacal etchant is substantially precipitated as double salt copper ammonium chloride [$(NH_4)_2CuCl_{4(s)}$]; (b) separating the double salt copper ammonium chloride [$(NH_4)_2CuCl_{4(s)}$] from the acidified spent ammoniacal etchant; (c) recovering copper (Cu) from the separated double salt copper ammonium chloride [$(NH_4)_2CuCl_{4(s)}$]; and (d) regenerating ammoniacal etchant from the separated spent ammoniacal etchant.

Defined also more broadly, the present invention is a method for recovering copper (Cu) from a spent ammoniacal etchant containing copper (Cu), comprising: (a) adding an adequate amount of hydrochloric acid (HCl) into a spent ammoniacal etchant containing copper ions ($Cu^{2+}$), ammonium ions ($NH_4^+$) and chloride ions ($Cl^-$) to produce an acidified spent ammoniacal etchant having a pH value in the range of between approximately 3 and approximately 6 and having increased concentrations of the ammonium ions ($NH_4^+$) and the chloride ions ($Cl^-$) substantially stoichiometrically equivalent to that of the copper ions ($Cu^{2+}$), so that all copper (Cu) contained in the acidified spent ammoniacal etchant is substantially precipitated as double salt copper ammonium chloride [$(NH_4)_2CuCl_{4(s)}$]; (b) separating the double salt copper ammonium chloride [$(NH_4)_2CuCl_{4(s)}$] from the acidified spent ammoniacal etchant; and (c) recovering copper (Cu) from the separated double salt copper ammonium chloride [$(NH_4)_2CuCl_{4(s)}$].

Defined again more broadly, the present invention is a method for regenerating ammoniacal etchant from a spent ammoniacal etchant containing copper (Cu), comprising: (a) adding an adequate amount of hydrochloric acid (HCl) into a spent ammoniacal etchant containing copper ions ($Cu^{2+}$), ammonium ions ($NH_4^+$) and chloride ions ($Cl^-$) to produce an acidified spent ammoniacal etchant having a pH value in the range of between approximately 3 and approximately 6 and having increased concentrations of the ammonium ions ($NH_4^+$) and the chloride ions ($Cl^-$) substantially stoichiometrically equivalent to that of the copper ions ($Cu^{2+}$), so that all copper (Cu) contained in the acidified spent ammoniacal etchant is substantially precipitated as double salt copper ammonium chloride [$(NH_4)_2CuCl_{4(s)}$]; (b) separating the double salt copper ammonium chloride [$(NH_4)_2CuCl_{4(s)}$] from the acidified spent ammoniacal etchant; and (c) regenerating ammoniacal etchant from the separated spent ammoniacal etchant.

Alternatively defined more broadly, the present invention is an apparatus for recovering copper (Cu) and regenerating ammoniacal etchant from a spent ammoniacal etchant containing copper (Cu), comprising: (a) means for adding an adequate amount of hydrochloric acid (HCl) into a spent ammoniacal etchant containing copper ions ($Cu^{2+}$), ammonium ions ($NH_4^+$) and chloride ions ($Cl^-$) to produce an acidified spent ammoniacal etchant having a pH value in the range of between approximately 3 and approximately 6 and having increased concentrations of the ammonium ions ($NH_4^+$) and the chloride ions ($Cl^-$) substantially stoichiometrically equivalent to that of the copper ions ($Cu^{2+}$), so that all copper (Cu) contained in the acidified spent ammoniacal etchant is substantially precipitated as double salt copper ammonium chloride [$(NH_4)_2CuCl_{4(s)}$]; (b) means for separating the double salt copper ammonium chloride [$(NH_4)_2CuCl_{4(s)}$] from the acidified spent ammoniacal etchant; (c) means for recovering copper (Cu) from the separated double salt copper ammonium chloride [$(NH_4)_2CuCl_{4(s)}$]; and (d) means for regenerating ammoniacal etchant from the separated spent ammoniacal etchant.

Alternatively defined also more broadly, the present invention is an apparatus for recovering copper (Cu) from a spent ammoniacal etchant containing copper (Cu), comprising: (a) means for adding an adequate amount of hydrochloric acid (HCl) into a spent ammoniacal etchant containing copper ions ($Cu^{2+}$), ammonium ions ($NH_4^+$) and chloride ions ($Cl^-$) to produce an acidified spent ammoniacal etchant having a pH value in the range of between approximately 3 and approximately 6 and having increased concentrations of the ammonium ions ($NH_4^+$) and the chloride ions ($Cl^-$) substantially stoichiometrically equivalent to that of the copper ions ($Cu^{2+}$), so that all copper (Cu) contained in the acidified spent ammoniacal etchant is substantially precipitated as double salt copper ammonium chloride [$(NH_4)_2CuCl_{4(s)}$]; (b) means for separating the double salt copper ammonium chloride [$(NH_4)_2CuCl_{4(s)}$] from the acidified spent ammoniacal etchant; and (c) means for recovering copper (Cu) from the separted double salt copper ammonium chloride [$(NH_4)_2CuCl_{4(s)}$].

Alternatively defined again more broadly, the present invention is an apparatus for regenerating ammoniacal etchant from a spent ammoniacal etchant containing copper (Cu), comprising: (a) means for adding an adequate amount of hydrochloric acid (HCl) into a spent ammoniacal etchant containing copper ions ($Cu^{2+}$), ammonium ions ($NH_4^+$) and chloride ions ($Cl^-$) to produce an acidified spent ammoniacal etchant having a pH value in the range of between approximately 3 and approximately 6 and having increased concentrations of the ammonium ions ($NH_4^+$) and the chloride ions ($Cl^-$) substantially stoichiometrically equivalent to that of the copper ions ($Cu^{2+}$), so that all copper (Cu) contained in the acidified spent ammoniacal etchant is substantially precipitated as double salt copper ammonium chloride [$(NH_4)_2CuCl_{4(s)}$]; (b) means for separating the double salt copper ammonium chloride [$(NH_4)_2CuCl_{4(s)}$] from the acidified spent ammoniacal etchant; and (c) means for regenerating ammoniacal etchant from the separated spent ammoniacal etchant.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modification in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A method for recovering copper (Cu) and regenerating ammoniacal etchant from a spent ammoniacal etchant containing copper (Cu), comprising:

a. adding an adequate amount of hydrochloric acid (HCl) into a spent ammoniacal etchant containing copper ions ($Cu^{2+}$), ammonium ions ($NH_4^+$) and chloride ions ($Cl^-$) to produce an acidified spent ammoniacal etchant having a pH value in the range of between approximately 3 and approximately 6 and having increased concentrations of the ammonium ions ($NH_4^+$) and the chloride ions ($Cl^-$) substantially stoichiometrically equivalent to that of the copper ions ($Cu^{2+}$), so that all copper (Cu)

contained in the acidified spent ammoniacal etchant is substantially precipitated as double salt copper ammonium chloride $[(NH_4)_2CuCl_{4(s)}]$;

b. separating said double salt copper ammonium chloride $[(NH_4)_2CuCl_{4(s)}]$ from said acidified spent ammoniacal etchant;

c. recovering copper (Cu) from said separated double salt copper ammonium chloride $[(NH_4)_2CuCl_{4(s)}]$; and d. regenerating ammoniacal etchant from said separated spent ammoniacal etchant.

2. The invention as defined in claim 1 wherein said pH value of said acidified spent ammoniacal etchant is approximately 4.5.

3. A method for recovering copper (Cu) and regenerating ammoniacal etchant from a spent ammoniacal etchant containing copper (Cu) and ammonia ($NH_3$), comprising:

a. adding an adequate amount of hydrochloric acid (HCl) into a spent ammoniacal etchant containing copper ions ($Cu^{2+}$), ammonium ions ($NH_4^+$) and chloride ions ($Cl^-$) to produce an acidified spent ammoniacal etchant having a pH value in the range of between approximately 4 and approximately 5 and having increased concentrations of the ammonium ions ($NH_4^+$) and the chloride ions ($Cl^-$) substantially stoichiometrically equivalent to that of the copper ions ($Cu^{2+}$), so that all copper (Cu) contained in the acidified spent ammoniacal etchant is substantially precipitated as double salt copper ammonium chloride $[(NH_4)_2CuCl_{4(s)}]$;

b. separating said double salt copper ammonium chloride $[(NH_4)_2CuCl_{4(s)}]$ from said acidified spent ammoniacal etchant, so that the separated spent ammoniacal etchant contains only a substantially small amount of copper (Cu);

c. converting said separated double salt copper ammonium chloride $[(NH_4)_2CuCl_{4(s)}]$ into copper oxide (CuO);

d. converting said copper oxide (CuO) into copper sulfate ($CuSO_4$) to thereby recover copper (Cu);

e. removing said substantially small amount of copper (Cu) from said separated spent ammoniacal etchant to produce a substantially copper-free ammoniacal etchant; and f. restoring the concentration of the ammonia ($NH_3$) substantially equivalent to that of an original ammoniacal etchant to thereby produce a regenerated ammoniacal etchant.

4. The invention as defined in claim 3 wherein said pH value of said acidified spent ammoniacal etchant is approximately 4.5.

5. A method for recovering copper (Cu) and regenerating ammoniacal etchant from a spent ammoniacal etchant containing copper (Cu), ammonia ($NH_3$) and ammonium chloride ($NH_4Cl$), comprising:

a. adding an adequate amount of hydrochloric acid (HCl) into a spent ammoniacal etchant containing copper ions ($Cu^{2+}$), ammonium ions ($NH_4^+$) and chloride ions ($Cl^-$) to produce an acidified spent ammoniacal etchant having a pH value of approximately 4.5 and having increased concentrations of the ammonium ions ($NH_4^+$) and the chloride ions ($Cl^-$) substantially stoichiometrically equivalent to that of the copper ions ($Cu^{2+}$), so that all copper (Cu) contained in the acidified spent ammoniacal etchant is substantially precipitated as double salt copper ammonium chloride $[(NH_4)_2CuCl_{4(s)}]$;

b. separating said double salt copper ammonium chloride $[(NH_4)_2CuCl_{4(s)}]$ from said acidified spent ammoniacal etchant by filtration, so that the separated spent ammoniacal etchant contains less than one thousand parts per million (1,000 ppm) of copper (Cu);

c. converting said separated double salt copper ammonium chloride $[(NH_4)_2CuCl_{4(s)}]$ into copper oxide (CuO) by using sodium hydroxide (NaOH), which also produces ammonia ($NH_3$) and sodium chloride (NaCl);

d. separating said copper oxide (CuO) from said ammonia ($NH_3$) and said sodium chloride (NaCl);

e. converting said copper oxide (CuO) into copper sulfate ($CuSO_4$) by using sulfuric acid ($H_2SO_4$) to thereby recover copper (Cu);

f. removing said substantially small amount of copper (Cu) from said separated spent ammoniacal etchant by passing said separated spent ammoniacal etchant through a tandem type cation-exchange resin to produce a substantially copper-free ammoniacal etchant having less than ten parts per million (10 ppm) of copper (Cu); and g. restoring the concentration of the ammonia ($NH_3$) substantially equivalent to that of an original ammoniacal etchant by adding an adequate amount of ammonia ($NH_3$) into said substantially copper-free ammoniacal etchant, to thereby produce a regenerated ammoniacal etchant.

6. The invention as defined in claim 5 wherein the step of removing said substantially small amount of copper (Cu) from said separated spent ammoniacal etchant by passing said separated spent ammoniacal etchant through a tandem type cation-exchange resin further comprises the step of providing treatment with sulfuric acid ($H_2SO_4$) to thereby recover copper (Cu) in the form of copper sulfate ($CuSO_4$).

7. A method for recovering copper (Cu) from a spent ammoniacal etchant containing copper (Cu), comprising:

a. adding an adequate amount of hydrochloric acid (HCl) into a spent ammoniacal etchant containing copper ions ($Cu^{2+}$), ammonium ions ($NH_4^+$) and chloride ions ($Cl^-$) to produce an acidified spent ammoniacal etchant having a pH value in the range of between approximately 3 and approximately 6 and having increased concentrations of the ammonium ions ($NH_4^+$) and the chloride ions ($Cl^-$) substantially stoichiometrically equivalent to that of the copper ions ($Cu^{2+}$), so that all copper (Cu) contained in the acidified spent ammoniacal etchant is substantially precipitated as double salt copper ammonium chloride $[(NH_4)_2CuCl_{4(s)}]$;

b. separating said double salt copper ammonium chloride $[(NH_4)_2CuCl_{4(s)}]$ from said acidified spent ammoniacal etchant; and c. recovering copper (Cu) from said separated double salt copper ammonium chloride $[(NH_4)_2CuCl_{4(s)}]$.

8. The invention as defined in claim 7 wherein said pH value of said acidified spent ammoniacal etchant is approximately 4.5.

9. The invention as defined in claim 7 wherein the step of recovering copper (Cu) from said separated double salt copper ammonium chloride $[(NH_4)_2CuCl_{4(s)}]$ further comprises:

a. converting said separated double salt copper ammonium chloride $[(NH_4)_2CuCl_{4(s)}]$ into copper oxide (CuO); and b. converting said copper oxide (CuO) into copper sulfate ($CuSO_4$) to thereby recover copper (Cu).

10. The invention as defined in claim 7 further comprising the step of regenerating ammoniacal etchant from said separated spent ammoniacal etchant.

11. A method for recovering copper (Cu) from a spent ammoniacal etchant containing copper (Cu) and ammonia ($NH_3$), comprising:
   a. adding an adequate amount of hydrochloric acid (HCl) into a spent ammoniacal etchant containing copper ions ($Cu^{2+}$), ammonium ions ($NH_4^+$) and chloride ions ($Cl^-$) to produce an acidified spent ammoniacal etchant having a pH value of approximately 4.5 and having increased concentrations of the ammonium ions ($NH_4^+$) and the chloride ions ($Cl^-$) substantially stoichiometrically equivalent to that of the copper ions ($Cu^{2+}$), so that all copper (Cu) contained in the acidified spent ammoniacal etchant is substantially precipitated as double salt copper ammonium chloride [$(NH_4)_2CuCl_{4(s)}$];
   b. separating said double salt copper ammonium chloride [$(NH_4)_2CuCl_{4(s)}$] from said acidified spent ammoniacal etchant by filtration;
   c. converting said separated double salt copper ammonium chloride [$(NH_4)_2CuCl_{4(s)}$] into copper oxide (CuO) by using sodium hydroxide (NaOH), which also produces ammonia ($NH_3$) and sodium chloride (NaCl);
   d. separating said copper oxide (CuO) from said ammonia ($NH_3$) and said sodium chloride (NaCl); and
   e. converting said copper oxide (CuO) into copper sulfate ($CuSO_4$) by using sulfuric acid ($H_2SO_4$) to thereby recover copper (Cu).

12. The invention as defined in claim 11 wherein the step of converting said copper oxide (CuO) into copper sulfate ($CuSO_4$) by using sulfuric acid ($H_2SO_4$) to thereby recover copper (Cu) further comprises the step of crystallizing said copper sulfate ($CuSO_4$) as pentahydrate.

13. A method for regenerating ammoniacal etchant from a spent ammoniacal etchant containing copper (Cu), comprising:
   a. adding an adequate amount of hydrochloric acid (HCl) into a spent ammoniacal etchant containing copper ions ($Cu^{2+}$), ammonium ions ($NH_4^+$) and chloride ions ($Cl^-$) to produce an acidified etchant having a pH value in the range of between approximately 3 and approximately 6 and having increased concentrations of the ammonium ions ($NH_4^+$) and the chloride ions ($Cl^-$) substantially stoichiometrically equivalent to that of the copper ions ($Cu^{2+}$), so that all copper (Cu) contained in the acidified spent ammoniacal etchant is substantially precipitated as double salt copper ammonium chloride [$(NH_4)_2CuCl_{4(s)}$];
   b. separating said double salt copper ammonium chloride [$(NH_4)_2CuCl_{4(s)}$] from said acidified spent ammoniacal etchant; and
   c. regenerating ammoniacal etchant from said separated spent ammoniacal etchant.

14. The invention as defined in claim 13 wherein said pH value of said acidified spent ammoniacal etchant is approximately 4.5.

15. The invention as defined in claim 13 wherein the step of regenerating ammoniacal etchant from said separated spent ammoniacal etchant further comprises:
   a. removing said substantially small amount of copper (Cu) from said separated spent ammoniacal etchant to produce a substantially copper-free ammoniacal etchant; and
   b. restoring the concentration of the ammonia ($NH_3$) substantially equivalent to that of an original ammoniacal etchant to thereby produce a regenerated ammoniacal etchant.

16. The invention as defined in claim 13 further comprising the step of recovering copper (Cu) from said separated double salt copper ammonium chloride [$(NH_4)_2CuCl_{4(s)}$].

17. A method for regenerating ammoniacal etchant from a spent ammoniacal etchant containing copper (Cu) and ammonia ($NH_3$), comprising:
   a. adding an adequate amount of hydrochloric acid (HCl) into a spent ammoniacal etchant containing copper ions ($Cu^{2+}$), ammonium ions ($NH_4^+$) and chloride ions ($Cl^-$) to produce an acidified spent ammoniacal etchant having a pH value of approximately 4.5 and having increased concentrations of the ammonium ions ($NH_4^+$) and the chloride ions ($Cl^-$) substantially stoichiometrically equivalent to that of the copper ions ($Cu^{2+}$), so that all copper (Cu) contained in the acidified spent ammoniacal etchant is substantially precipitated as double salt copper ammonium chloride [$(NH_4)_2CuCl_{4(s)}$];
   b. separating said double salt copper ammonium chloride [$(NH_4)_2CuCl_{4(s)}$] from said acidified spent ammoniacal etchant by filtration, so that the separated spent ammoniacal etchant contains less than one thousand parts per million (1,000 ppm) of copper (Cu);
   c. removing said substantially small amount of copper (Cu) from said separated spent ammoniacal etchant by passing said separated spent ammoniacal etchant through a tandem type cation-exchange resin to produce a substantially copper-free ammoniacal etchant having less than ten parts per million (10 ppm) of copper (Cu); and
   d. restoring the concentration of the ammonia ($NH_3$) substantially equivalent to that of an original ammoniacal etchant by adding an adequate amount of ammonia ($NH_3$) into said substantially copper-free ammoniacal etchant, to thereby produce a regenerated ammoniacal etchant.

18. The invention as defined in claim 17 wherein the step of removing said substantially small amount of copper (Cu) from said separated spent ammoniacal etchant by passing said separated spent ammoniacal etchant through a tandem type cation-exchange resin further comprises the step of providing treatment with sulfuric acid ($H_2SO_4$) to thereby recover copper (Cu) in the form of copper sulfate ($CuSO_4$).

19. An apparatus for recovering copper (Cu) and regenerating ammoniacal etchant from a spent ammoniacal etchant containing copper (Cu), comprising:
   a. means for adding an adequate amount of hydrochloric acid (HCl) into a spent ammoniacal etchant containing copper ions ($Cu^{2+}$), ammonium ions ($NH_4^+$) and chloride ions ($Cl^-$) to produce an acidified spent ammoniacal etchant having a pH value in the range of between approximately 3 and approximately 6 and having increased concentrations of the ammonium ions ($NH_4^+$) and the chloride ions ($Cl^-$) substantially stoichiometrically equivalent to that of the copper ions ($Cu^{2+}$), so that all copper (Cu) contained in the acidified spent ammoniacal etchant is substantially precipitated as double salt copper ammonium chloride [(NH$_4$)$_2$CuCl$_{4(s)}$];

b. means for separating said double salt copper ammonium chloride [(NH$_4$)$_2$CuCl$_{4(s)}$] from said acidified spent ammoniacal etchant;

c. means for recovering copper (Cu) from said separated double salt copper ammonium chloride [(NH$_4$)$_2$CuCl$_{4(s)}$]; and d. means for regenerating ammoniacal etchant from said separated spent ammoniacal etchant.

20. The invention as defined in claim 19 wherein said pH value of said acidified spent ammoniacal etchant is approximately 4.5.

21. An apparatus for recovering copper (Cu) and regenerating ammoniacal etchant from a spent ammoniacal etchant containing copper (Cu) and ammonia (NH$_3$), comprising:

a. means for adding an adequate amount of hydrochloric acid (HCl) into a spent ammoniacal etchant containing copper ions (Cu$^{2+}$), ammonium ions (NH$_4^+$) and chloride ions (Cl$^-$) to produce an acidified spent ammoniacal etchant having a pH value in the range of between approximately 4 and approximately 5 and having increased concentrations of the ammonium ions (NH$_4^+$) and the chloride ions (Cl$^-$) substantially stoichiometrically equivalent to that of the copper ions (Cu$^{2+}$), so that all copper (Cu) contained in the acidified spent ammoniacal etchant is substantially precipitated as double salt copper ammonium chloride [(NH$_4$)$_2$CuCl$_{4(s)}$];

b. means for separating said double salt copper ammonium chloride [(NH$_4$)$_2$CuCl$_{4(s)}$] from said acidified spent ammoniacal etchant, so that the separated spent ammoniacal etchant contains only a substantially small amount of copper (Cu);

c. means for converting said separated double salt copper ammonium chloride [(NH$_4$)$_2$CuCl$_{4(s)}$] into copper oxide (CuO);

d. means for converting said copper oxide (CuO) into copper sulfate (CuSO$_4$) to thereby recover copper (Cu);

e. means for removing said substantially small amount of copper (Cu) from said separated spent ammoniacal etchant to produce a substantially copper-free ammoniacal etchant; and f. means for restoring the concentration of the ammonia (NH$_3$) substantially equivalent to that of an original ammoniacal etchant to thereby produce a regenerated ammoniacal etchant.

22. The invention as defined in claim 21 wherein said pH value of said acidified spent ammoniacal etchant is approximately 4.5.

23. An apparatus for recovering copper (Cu) and regenerating ammoniacal etchant from a spent ammoniacal etchant containing copper (Cu), ammonia (NH$_3$) and ammonium chloride (NH$_4$Cl), comprising:

a. means for adding an adequate amount of hydrochloric acid (HCl) into a spent ammoniacal etchant containing copper ions (Cu$^{2+}$), ammonium ions (NH$_4^+$) and chloride ions (Cl$^-$) to produce an acidified spent ammoniacal etchant having a pH value of approximately 4.5 and having increased concentrations of the ammonium ions (NH$_4^+$) and the chloride ions (Cl$^-$) substantially stoichiometrically equivalent to that of the copper ions (Cu$^{2+}$), so that all copper (Cu) contained in the acidified spent ammoniacal etchant is substantially precipitated as double salt copper ammonium chloride [(NH$_4$)$_2$CuCl$_{4(s)}$];

b. means for separating said double salt copper ammonium chloride [(NH$_4$)$_2$CuCl$_{4(s)}$] from said acidified spent ammoniacal etchant by filtration, so that the separated spent ammoniacal etchant contains less than one thousand parts per million (1,000 ppm) of copper (Cu);

c. means for converting said separated double salt copper ammonium chloride [(NH$_4$)$_2$CuCl$_{4(s)}$] into copper oxide (CuO) by using sodium hydroxide (NaOH), which also produces ammonia (NH$_3$) and sodium chloride (NaCl);

d. means for separating said copper oxide (CuO) from said ammonia (NH$_3$) and said sodium chloride (NaCl);

e. means for converting said copper oxide (CuO) into copper sulfate (CuSO$_4$) by using sulfuric acid (H$_2$SO$_4$) to thereby recover copper (Cu);

f. means for removing said substantially small amount of copper (Cu) from said separated spent ammoniacal etchant by passing said separated spent ammoniacal etchant through a tandem type cation-exchange resin to produce a substantially copper-free ammoniacal etchant having less than ten parts per million (10 ppm) of copper (Cu); and g. means for restoring the concentration of the ammonia (NH$_3$) substantially equivalent to that of an original ammoniacal etchant by adding an adequate amount of ammonia (NH$_3$) into said substantially copper-free ammoniacal etchant, to thereby produce a regenerated ammoniacal etchant.

24. The invention as defined in claim 23 wherein said means for converting said copper oxide (CuO) into copper sulfate (CuSO$_4$) by using sulfuric acid (H$_2$SO$_4$) to thereby recover copper (Cu) further comprises means for crystallizing said copper sulfate (CuSO$_4$) as pentahydrate.

25. The invention as defined in claim 23 wherein said means for removing said substantially small amount of copper (Cu) from said separated spent ammoniacal etchant by passing said separated spent ammoniacal etchant through a tandem type cation-exchange resin further comprises means for providing treatment with sulfuric acid (H$_2$SO$_4$) to thereby recover copper (Cu) in the form of copper sulfate (CuSO$_4$).

26. An apparatus for recovering copper (Cu) from a spent ammoniacal etchant containing copper (Cu), comprising:

a. means for adding an adequate amount of hydrochloric acid (HCl) into a spent ammoniacal etchant containing copper ions (Cu$^{2+}$), ammonium ions (NH$_4^+$) and chloride ions (Cl$^-$) to produce an acidified spent ammoniacal etchant having a pH value in the range of between approximately 3 and approximately 6 and having increased concentrations of the ammonium ions (NH$_4^+$) and the chloride ions (Cl$^-$) substantially stoichiometrically equivalent to that of the copper ions (Cu$^{2+}$), so that all copper (Cu) contained in the acidified spent ammoniacal etchant is substantially precipitated as double salt copper ammonium chloride [(NH$_4$)$_2$CuCl$_{4(s)}$];

b. means for separating said double salt copper ammonium chloride [(NH$_4$)$_2$CuCl$_{4(s)}$] from said acidified spent ammoniacal etchant; and c. means for recovering copper (Cu) from said separated double salt copper ammonium chloride [$(NH_4)_2CuCl_{4(s)}$].

27. An apparatus for regenerating ammoniacal etchant from a spent ammoniacal etchant containing copper (Cu), comprising:

a. means for adding an adequate amount of hydrochloric acid (HCl) into a spent ammoniacal etchant containing copper ions ($Cu^{2+}$), ammonium ions ($NH_4^+$) and chloride ions ($Cl^-$) to produce an acidified spent ammoniacal etchant having a pH value in the range of between approximately 3 and approximately 6 and having increased concentrations of the ammonium ions ($NH_4^+$) and the chloride ions ($Cl^-$) substantially stoichiometrically equivalent to that of the copper ions ($Cu^{2+}$), so that all copper (Cu) contained in the acidified spent ammoniacal etchant is substantially precipitated as double salt copper ammonium chloride [$(NH_4)_2CuCl_{4(s)}$];

b. means for separating said double salt copper ammonium chloride [$(NH_4)_2CuCl_{4(s)}$] from said acidified spent ammoniacal etchant; and c. means for regenerating ammoniacal etchant from said separated spent ammoniacal etchant.

* * * * *